United States Patent
Takahashi et al.

(10) Patent No.: US 10,182,206 B2
(45) Date of Patent: Jan. 15, 2019

(54) IMAGE DISPLAY SYSTEM AND IMAGE DISPLAY METHOD

(71) Applicants: Daiwa House Industry Co., Ltd., Osaka (JP); Sony Corporation, Tokyo (JP)

(72) Inventors: Yasuo Takahashi, Osaka (JP); Hiroki Matsumoto, Osaka (JP); Tsukasa Nakano, Osaka (JP); Takashi Orime, Osaka (JP); Yuichiro Takeuchi, Tokyo (JP); Yasushi Miyajima, Tokyo (JP)

(73) Assignees: Daiwa House Industry Co., Ltd., Osaka (JP); Sony Corporation, Tokyo (JP)

( * ) Notice: Subject to any disclaimer, the term of this patent is extended or adjusted under 35 U.S.C. 154(b) by 0 days.

(21) Appl. No.: 15/562,331

(22) PCT Filed: Mar. 30, 2016

(86) PCT No.: PCT/JP2016/060530
§ 371 (c)(1),
(2) Date: Sep. 27, 2017

(87) PCT Pub. No.: WO2016/159163
PCT Pub. Date: Oct. 6, 2016

(65) Prior Publication Data
US 2018/0205912 A1 Jul. 19, 2018

(30) Foreign Application Priority Data
Mar. 31, 2015 (JP) .................................. 2015-071761

(51) Int. Cl.
*H04N 7/15* (2006.01)
*H04N 7/18* (2006.01)
(Continued)

(52) U.S. Cl.
CPC ............. *H04N 7/15* (2013.01); *G06F 3/0346* (2013.01); *H04N 7/147* (2013.01); *H04N 7/18* (2013.01)

(58) Field of Classification Search
None
See application file for complete search history.

(56) References Cited

U.S. PATENT DOCUMENTS 9,939,167 B2 * 4/2018 Hoppe ..................... F24F 11/52
2012/0127261 A1 * 5/2012 Okada ...................... H04N 7/15
348/14.08
(Continued)

FOREIGN PATENT DOCUMENTS

JP 2002062832 A 2/2002
JP 2005078347 A 3/2005
(Continued)

*Primary Examiner* — Creighton Smith
(74) *Attorney, Agent, or Firm* — Young Basile Hanlon & MacFarlane, P.C.

(57) ABSTRACT

In an image display system for viewing, by a user in a first space, an image of a second space remote from the first space, image data indicating an image acquired by an imaging device placed in the second space is received from the imaging device. A partial image of the image indicated by the received image data is displayed on a display screen in the first space, the partial image having a display size corresponding to the size of the display screen. At least one of the position, the facial direction, the visual line, or the facial position of the user in the first space is detected by a detector. When a detection result of the detector changes while the partial image is being displayed, it is determined which partial image of the image indicated by the image data is to be displayed on the display screen.

7 Claims, 10 Drawing Sheets

(51) Int. Cl.
*G06F 3/0346* (2013.01)
*H04N 7/14* (2006.01)

(56) References Cited

U.S. PATENT DOCUMENTS

| | | | |
|---|---|---|---|
| 2015/0109401 A1* | 4/2015 | Kasatani | H04N 7/15 348/14.07 |
| 2015/0195601 A1* | 7/2015 | Hahm | H04N 21/4122 725/116 |

FOREIGN PATENT DOCUMENTS

| | | | |
|---|---|---|---|
| JP | 2005286442 A | 10/2005 |
| JP | 2009196593 A | 9/2009 |
| JP | 2011004054 A | 1/2011 |
| JP | 2011077710 A | 4/2011 |
| JP | 2012190230 A | 10/2012 |
| JP | 2013073505 A | 4/2013 |

\* cited by examiner

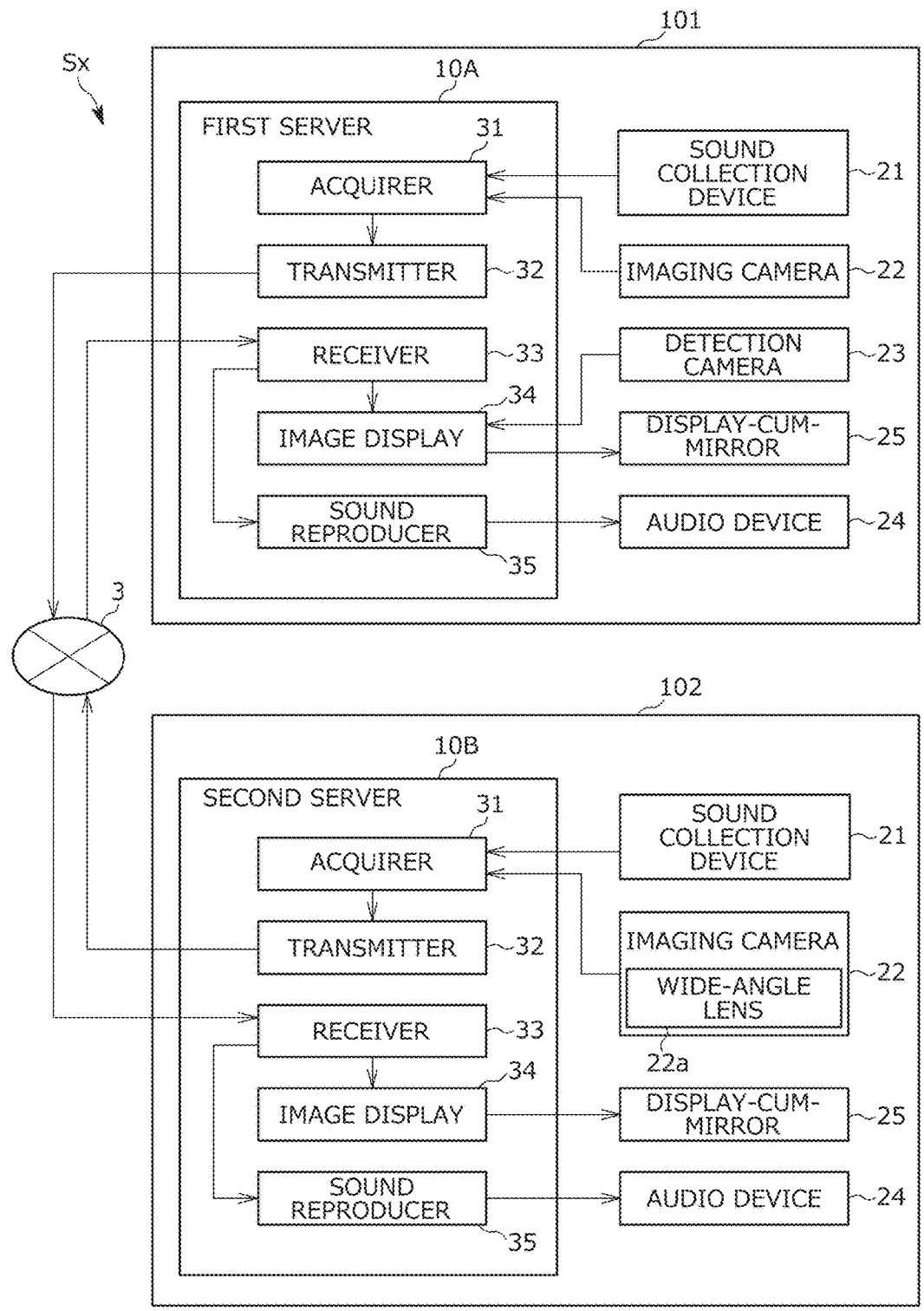

IMAGE DISPLAY SYSTEM AND IMAGE DISPLAY METHOD

CROSS REFERENCE TO RELATED APPLICATION

This application claims priority to Japanese Patent Application No. 2015-071761, filed on Mar. 31, 2015, and is herein incorporated by reference in its entirety.

TECHNICAL FIELD

The present invention relates to an image display system and an image display method. Specifically, the present invention relates to an image display system and an image display method used for viewing an image of a remote location by a user.

BACKGROUND

It has been already known that a communication technique is utilized to have a dialogue (a conversation) while persons at remote locations are viewing their images each other via displays for image displaying. In recent years, the technique (in a precise sense, the technique of switching a displayed image) of changing the displayed image in association with a communicator's visual line or facial direction has been developed. Since the displayed image changes in association with movement of a communicator as described above, realistic sensation in the dialogue using the communication technique can be enhanced.

An example will be described in detail. According to JP 2012-190230 A, an in-camera of a communication terminal (e.g., a mobile phone or a smartphone) owned by a communicator oneself is used to analyze, e.g., the visual line direction of the communicator. After analysis, an image (a video) corresponding to the visual line direction is generated, and is displayed on a display of the communication terminal owned by the communicator. Thus, when the visual line direction changes with respect to the image displayed on the display, the displayed image can be switched corresponding to the changed visual line direction.

However, in the technique described in JP 2012-190230 A, the angle of viewing a display target object or a display target person on a partner side is merely switched in association with the change in the visual line direction of the communicator. That is, in the technique described in JP 2012-190230 A, even when the visual line direction of the communicator changes, the display target object itself or the display target person oneself does not change.

On the other hand, according to JP 2005-286442 A, when a communicator's position, visual line, or facial direction changes, a camera configured to acquire a partner-side image performs zooming/panning/tilting operation. Thus, when the communicator's position, visual line, or facial direction changes accordingly, a camera imaging direction or angular field is switched according to such a change. A displayed image after switching includes an object or a person next to a person displayed before switching. Since a display target object (a display target person) is, as described above, switched according to the change in the communicator's visual line or facial direction, a communicator obtains the visual effect of providing a feeling as if the communicator is in the same space as that of a dialogue partner.

The above-described visual effect is preferably realized by a simpler configuration. On the other hand, in JP 2005-286442 A, an additional device for camera driving is required as the configuration for obtaining the above-described visual effect. For this reason, when an attempt is made to obtain the above-described visual effect in the configuration described in JP 2005-286442 A, a cost of a system for such a configuration might increase, and the configuration might be complicated.

SUMMARY

For this reason, the present invention has been made in view of the above-described problems, and is intended to provide, as an image display system used for viewing an image of a remote location by a user, an image display system configured so that the visual effect of providing a feeling as if the user is at such a remote location can be realized by a simple configuration. Similarly, the present invention is also intended to provide an image display method configured so that the above-described visual effect can be obtained by a simpler configuration.

According to the image display system of the present invention, the above-described problems are solved by an image display system used for viewing, by a user in a first space, an image of a second space remote from the first space. The image display system includes (A) an imaging device placed in the second space, (B) a display screen formation instrument placed in the first space to form an image display screen, (C) a receiver configured to receive image data from the imaging device, the image data indicating an image acquired by the imaging device, (D) an image display configured to display, on the display screen, a partial image of the image indicated by the image data received by the receiver, the partial image having a display size corresponding to the size of the display screen, and (E) a detector configured to detect at least one of the position, facial direction, visual line, or facial position of the user in the first space. (F) When a detection result of the detector changes, the image display determines, according to the detection result after the change, which partial image of the image indicated by the image data is to be displayed on the display screen.

In the above-described image display system, at least one of the position, facial direction, visual line, or facial position of the user in the first space is detected by the detector. The image display displays, on the display screen, the partial image of the image of the second space acquired by the imaging device, the partial image corresponding to the detection result of the detector. Moreover, when the detection result of the detector changes, the image display determines, according to the detection result after the change, which partial image is to be displayed on the display screen. The above-described configuration is simpler as the configuration for obtaining the visual effect of providing a feeling as if the user in the first space is in the second space. Thus, the additional device for switching the imaging direction or angle field of the imaging device is not necessary, and the above-described visual effect is properly obtained.

Moreover, the above-described image display system may further include first and second computers communicable with each other. The first computer may be connected to the imaging device, and may function as a transmitter configured to transmit the image data indicating the image acquired by the imaging device. The second computer may be connected to the display screen formation instrument and the detector, and may function as the receiver and the image display.

In the above-described configuration, the computer has the functions as the receiver and the image display. That is, the computer executes, as the receiver and the image display, a series of data processing, and therefore, the above-described visual effect is obtained. That is, in the above-described configuration, when a displayed image is switched in association with the change in the position, facial direction, visual line, or facial position of the user, the above-described configuration is realized only by data processing without the need for the mechanical configuration. As a result, the above-described visual effect can be obtained by a simpler configuration.

In addition, in the above-described image display system, the imaging device may be a fixed camera including a fish-eye lens or a wide-angle lens and configured to acquire an image via the fish-eye lens or the wide-angle lens.

In the above-described configuration, the image acquired by the imaging device is a wide image with a relatively-great angle of field. When the image with the great angle of field can be acquired as an original image, the partial image can be easily switched according to the change in the position, facial direction, visual line, or facial position of the user.

Further, in the above-described image display system, the detector may be another imaging device placed in the first space. The another imaging device may be configured to image the user in the front of the display screen formation instrument to detect the position of the face of the user. The image display may calculate a coordinate value indicating the position of the face of the user detected by the another imaging device, and when the coordinate value changes due to a change in the position of the face of the user, may determine, according to the coordinate value after the change, which partial image of the image indicated by the image data is to be displayed on the display screen.

In the above-described configuration, the position of the face of the user is detected in such a manner that the user in the front of the display screen formation instrument is imaged. Subsequently, the coordinate value indicating the detected position of the face of the user is calculated. Then, when the partial image is displayed on the display screen, the partial image corresponding to the calculated coordinate value is displayed. Further, when the coordinate value changes due to the change in the position of the face of the user, the partial image corresponding to the coordinate value after the change is displayed on the display screen. As a result, the partial image displayed on the display screen is properly switched in association with the change in the position of the face of the user.

In addition, in the above-described image display system, when the calculated coordinate value is a preset reference value, the image display may display, on the display screen, a reference partial image of the image indicated by the image data, the reference partial image being set corresponding to the reference value. When the calculated coordinate value is different from the reference value, the image display may display, on the display screen, a partial image of the image indicated by the image data, the partial image being shifted from the reference partial image according to a shift amount between the coordinate value and the reference value.

In the above-described configuration, when the coordinate value is calculated for a current position of the face of the user, in a case where such a calculation result is the reference value, the reference partial image is displayed. On the other hand, in a case where the calculation result is different from the reference value, the partial image shifted from the reference partial image according to such a shift amount is displayed. Thus, the partial image displayed on the display screen is properly determined according to the current position of the face of the user.

Moreover, in the above-described image display system, when the user in the front of the display screen formation instrument moves one's face in a first direction of first and second directions opposing each other as viewed from the display screen formation instrument, the image display may display, on the display screen, the partial image shifted in the second direction from the partial image displayed before movement. When the user in the front of the display screen formation instrument moves one's face in the second direction as viewed from the display screen formation instrument, the image display may display, on the display screen, the partial image shifted in the first direction from the partial image displayed before movement.

In the above-described configuration, when the user in the front of the display screen formation instrument moves in the first direction as viewed from the display screen formation instrument, the partial image shifted in the second direction from the partial image displayed before movement is displayed on the display screen. On the other hand, when the user moves in the second direction, the partial image shifted in the first direction from the partial image displayed before movement is displayed on the display screen. That is, according to the above-described configuration, when the user changes the position of the face, the image corresponding to the changed direction is displayed on the display screen. As a result, merely by movement of the face, the user can view an object (a person) next to an object (a person) viewed via the display screen before movement. That is, by the above-described configuration, a so-called "glancing" effect can be obtained.

Further, in the above-described image display system, the display screen formation instrument may form a portion of a building material, furniture, or a decoration disposed in the first space, and may form the display screen. A sensor may be provided in the first space, the sensor being configured to sense a sensing target satisfying a preset sensing condition when the sensing target is at least one of the action of the user, the position of the user, the posture of the user, or the sound from the user. While the sensor is not sensing the sensing target satisfying the sensing condition, the display screen formation instrument may have an outer appearance as the portion without formation of the display screen. Only while the sensor is sensing the sensing target satisfying the sensing condition, the display screen formation instrument may form the display screen.

In the above-described configuration, when at least one of the action, position, posture, or sound of the user is sensed in the first space, the image display screen is formed with using such a state as a trigger. On the other hand, the display screen is not formed during the period of not sensing the sensing target as the trigger. Instead, the display screen formation instrument shows the outer appearance as a portion of the building material, the furniture, or the decoration in the first space. Thus, the display screen formation instrument functions as, e.g., the building material during the period of not displaying the image, and is less noticeable in the first space. On the other hand, when the sensing target is sensed in the first space as described above, the display screen is formed with using such a state as a trigger. Thus, special complicated operation is not required for forming the display screen.

In addition, according to the image display method of the present invention, the above-described problems are solved by an image display method in which a user in a first space uses a computer to view an image of a second space remote from the first space. The image display method includes (A) the step of receiving, by the computer, image data from an imaging device placed in the second space, the image data indicating an image acquired by the imaging device, (B) the step of displaying, by the computer, a partial image of the image indicated by the received image data on a display screen formed by a display screen formation instrument placed in the first space, the partial image having a display size corresponding to the size of the display screen, and (C) the step of detecting, by a detector, at least one of the position, facial direction, visual line, or facial position of the user in the first space. (D) When a detection result of the detector changes during execution of the step of displaying the partial image on the display screen, the computer determines, according to the detection result after the change, which partial image of the image indicated by the image data is to be displayed on the display screen.

According to the above-described method, the image (the partial image) displayed on the display screen is switched in association with the change in the position, visual line, etc. of the user, and therefore, the visual effect of providing a feeling as if the user is in the second space can be obtained by a simpler configuration.

According to the image display system and the image display method of the present invention, the image (the partial image) displayed on the display screen is switched in association with the change in the facial position, visual line, etc. of the user. Thus, merely by movement of the face, the "glancing" effect of viewing the object (the person) next to the object (the person) viewed via the display screen before movement is obtained. Moreover, it is configured such that a special mechanism is not necessary for obtaining the visual effect, and therefore, a simpler configuration can be realized. As described above, according to the image display system and the image display method of the present invention, the "glancing" effect is obtained by a relatively-simple configuration.

BRIEF DESCRIPTION OF THE DRAWINGS

FIG. 9 is a diagram of a configuration of an image display system of a variation.

DETAILED DESCRIPTION OF THE EMBODIMENTS

One embodiment (hereinafter referred to as a "present embodiment") of the present invention will be described below with reference to the drawings. Note that for the sake of clear description, a situation where a person A and a person B at remote locations have a dialogue via an image display system of the present embodiment will be described below as a specific example. Moreover, in description below, the person A is a "user," and the person B is a "dialogue partner." Note that a relationship between the "user" and the "dialogue partner" is a relative relationship in terms of standpoint. In a case where one of communicators is set as the "user," the other communicator is inevitably the "dialogue partner." The contents of the present embodiment described below are also similarly applied when the standpoints of the person A and the person B are switched, i.e., the person B is the "user" and the person A is the "dialogue partner."

Moreover, in description below, a "first space" is a space where the person A as the "user" is present. A "second space" is a space where the person B as the "dialogue partner" is present. The first and second spaces as described herein are remote from each other. Specifically, in the present embodiment, the first and second spaces are spaces provided respectively at different buildings (e.g., a home of the person A and a home of the person B). Note that the present invention is not limited to such a case, and the first and second spaces may be two rooms remote from each other in the same building. Note that as in the relationship between the "user" and the "dialogue partner," a relationship between the "first space" and the "second space" is a relative relationship. That is, a space where a person set as the "user" is present corresponds to the "first space," and a space where a person set as the "dialogue partner" is present corresponds to the "second space."

<<Configuration of Image Display System of Present Embodiment>>

Figure 1:
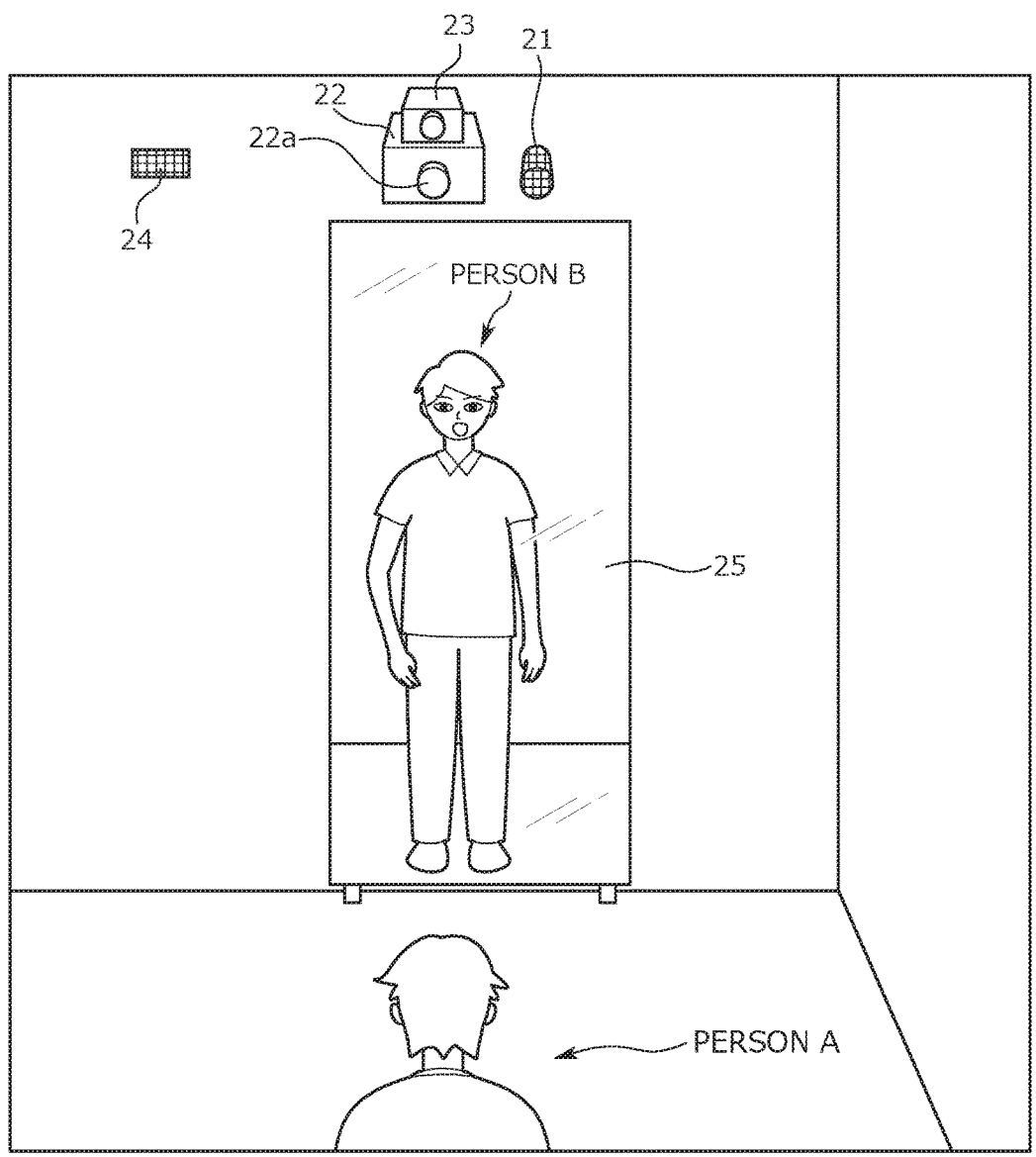
FIG. 1 is a view of a state when a user in a first space is viewing an image of a second space via a display screen.
Figure 2:
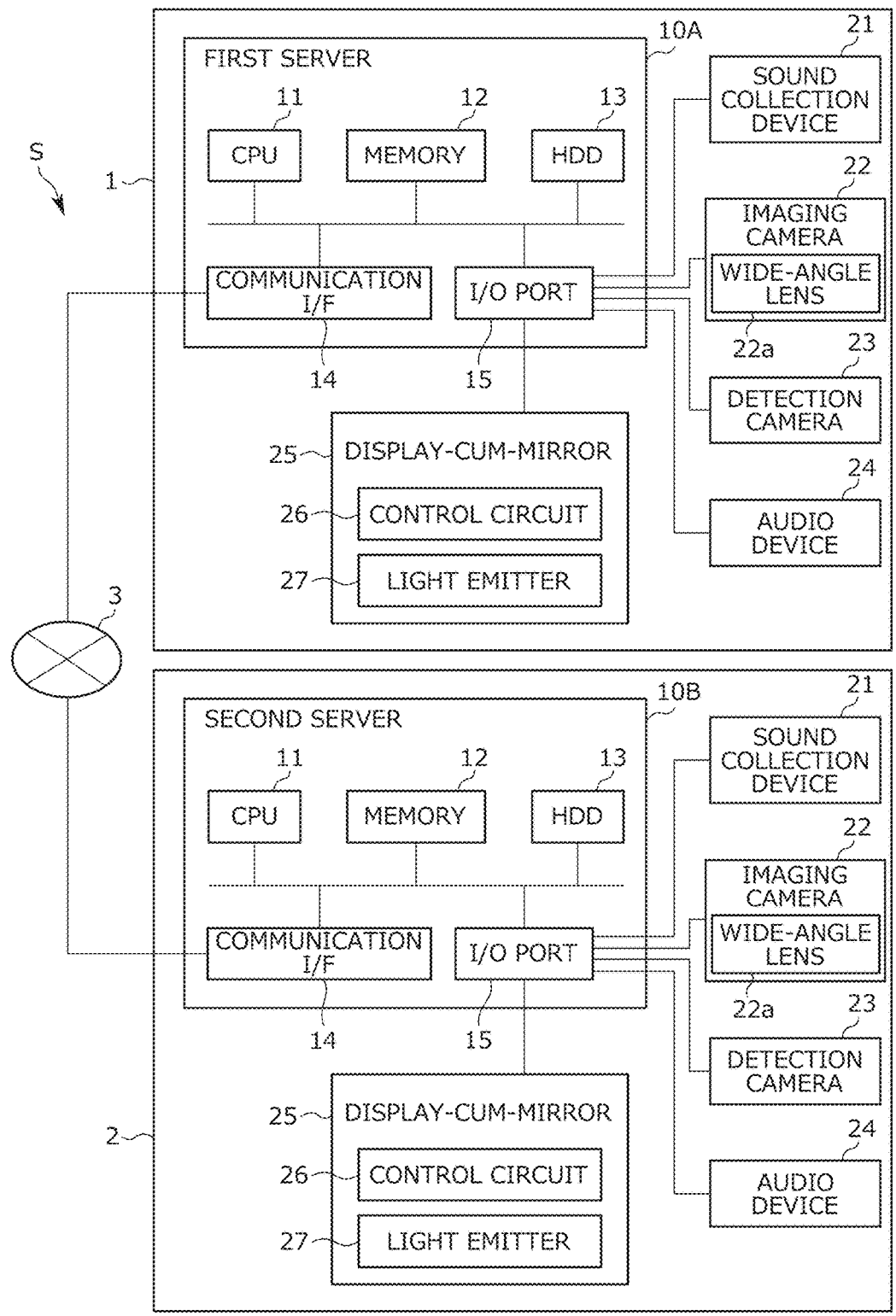
FIG. 2 is a block diagram of a configuration of an image display system of one embodiment of the present invention.

First, a use application and a configuration of an image display system (hereinafter referred to as a "present system S") of the present embodiment will be described with reference to FIGS. 1 and 2. FIG. 1 is a view of a state when the person A in the first space is viewing an image of the second space via a display screen. FIG. 2 is a block diagram of the configuration of the present system S.

The use application of the present system S will be described. As illustrated in FIG. 1, the present system S is used for holding a dialogue between the persons A and B while the persons A and B are viewing their images each other. That is, the person A can be in the first space while viewing the image of the second space and listing to sound of the second space. Similarly, the person B can be in the second space while viewing an image of the first space and listening to sound of the first space.

More specifically, the image of the person B and a peripheral image thereof are displayed on a display placed in the first space where the person A is present. Moreover, the sound of the second space including speaking voice of the person B is reproduced by an audio device placed in the first space where the person A is present. The person A stands in the front of the display as illustrated in FIG. 1, and views the image displayed on the display while listening to the sound reproduced by the audio device. Similarly, the person B views the image of the person A and a peripheral image thereof on a display placed in the second space while listening to the sound of the first space reproduced by an audio device. As a result, both of the persons A and B can obtain the audiovisual effect of providing a feeling as if the persons A and B are having a dialogue at the same location even though the persons A and B are at the remote locations.

In other words, the function of the present system S realizes a dialogue with realistic sensation between persons at remote locations.

Next, the configuration of the present system S will be described. As illustrated in FIG. 2, the present system S includes dialogue units 1, 2 provided respectively in the first and second spaces. The dialogue unit 1 provided in the first space and the dialogue unit 2 provided in the second space as described herein have a common configuration. Thus, in description below, only a configuration of the dialogue unit 1 provided in the first space will be described.

The dialogue unit 1 includes a server computer as an example of a computer, audiovisual equipment, etc. The server computer provided at the dialogue unit 1 corresponds to a first computer, and is configured to control acquisition of the image and sound of the first space and reproduction of the image and sound of the second space. Such a computer will be hereinafter referred to as a "first server 10A." This first server 10A is communicatably connected to a second server 10B via a communication line 3 such as the Internet. The second server 10B described herein is a server computer provided at the dialogue unit 2, and corresponds to a second computer. The second server 10B is configured to control acquisition of the image and sound of the second space and reproduction of the image and sound of the first space.

The first server 10A communicates with the second server 10B to receive data (hereinafter referred to as "dialogue data") indicating the image and sound of the second space. Similarly, the second server 10B communicates with the first server 10A to receive dialogue data indicating the image and sound of the first space. Note that although not shown in FIG. 2, a relay server (a proxy server) is generally interposed between the dialogue units 1, 2. That is, the dialogue data transmitted/received between the dialogue units 1, 2 is normally routed through the above-described relay server.

A configuration of the first server 10A will be described in more detail. As illustrated in FIG. 2, the first server 10A includes a CPU 11, a memory 12 such as a ROM or a RAM, a hard disk drive 13 (indicated by "HDD" in FIG. 2), a communication interface 14 (a communication I/F in FIG. 2), and an I/O port 15. The first server 10A is configured to receive data transmitted from the second server 10B via the communication line 3, thereby storing the data in the memory 12 or the hard disk drive 13. Moreover, a program (hereinafter referred to as a "dialogue program") defining an algorithm of a series of data processing for dialogue is stored in the memory 12. The dialogue program is executed by each of the first server 10A and the second server 10B, and in this manner, later-described dialogue communication processing progresses.

Note that in the present embodiment, the first server 10A is disposed in another space in the same building as that of the first space. Note that an arrangement location of the first server 10A is not specifically limited. The first server 10A may be disposed in the first space, or may be disposed at a building different from the building to which the first space belongs.

Next, the audiovisual equipment provided in the first space will be described. As illustrated in FIGS. 1 and 2, the audiovisual equipment includes a sound collection device 21, an imaging camera 22 as an imaging device, a detection camera 23 as a detector, an audio device 24, and a display (in a precise sense, a later-described display-cum-mirror 25).

The sound collection device 21 is a device configured to collect the sound of the first space including speaking voice of the person A, and includes a well-known device such as a microphone. This sound collection device 21 is configured to output a sound signal indicating the collected sound, and the sound signal is input to the I/O port 15 provided at the first server 10A.

The imaging camera 22 is a fixed camera fixed at a predetermined position in the first space, specifically a position above the display, to image the figure of the person A and a peripheral space thereof. A configuration of the imaging camera 22 is well known. The imaging camera 22 is configured to output an image signal indicating the acquired image, and the image signal is input to the I/O port 15 provided at the first server 10A. Note that the imaging camera 22 of the present embodiment is equipped with a wide-angle lens 22a, and is configured to acquire the image of the first space via the wide-angle lens 22a. Thus, the image acquired by the imaging camera 22 is an image (hereinafter referred to as a "wide image") whose angle of field is greater than that of an image acquired by a normal video camera.

Note that in the present embodiment, the lens mounted on the imaging camera 22 is the wide-angle lens 22a. However, a fish-eye lens may be used instead of the wide-angle lens 22a. In this case, the image acquired by the imaging camera 22 is an omnidirectional image with a greater angle of filed.

The detection camera 23 corresponds to another imaging device, and functions as a detector configured to detect a person's facial position when a person is in the front of the display. More specifically, the detection camera 23 includes a built-in human sensor. This human sensor is configured to sense entrance of a person when the person enters a sensing area set to the front of the display. When the human sensor detects entrance of the person into the sensing area, the detection camera 23 is started up with using such detection as a trigger. The detection camera 23 images such a person to detect the facial position of the person in the sensing area. Then, the detection camera 23 outputs the image signal indicating the acquired image, and the image signal is input to the I/O port 15 provided at the first server 10A.

Note that in the present embodiment, the detection camera 23 is configured to detect the position of the face of the person in the front of the display, but is not limited to such a configuration. The detection camera 23 may detect at least one of the position (the standing position), the facial direction, the visual line, or the facial position of the person in the front of the display.

The audio device 24 is a device configured to reproduce sound, and includes a well-known device such as a speaker. When the first server 10A expands the dialogue data received from the second server 10B to output a reproduction command, the audio device 24 receives such a command to reproduce the sound indicated by the dialogue data. As a result, the sound of the second space including the speaking voice of the person B is reproduced in the first space where the audio device 24 is disposed.

The display is a device configured to form the display screen for displaying the image of the second space including the image of the person B, and corresponds to a display screen formation instrument. This display receives an image display command after the first server 10A has expanded the dialogue data received from the second server 10B, and then, displays the image indicated by the dialogue data. As a result, the image of the second space is displayed on the display screen of the display.

Figure 3:
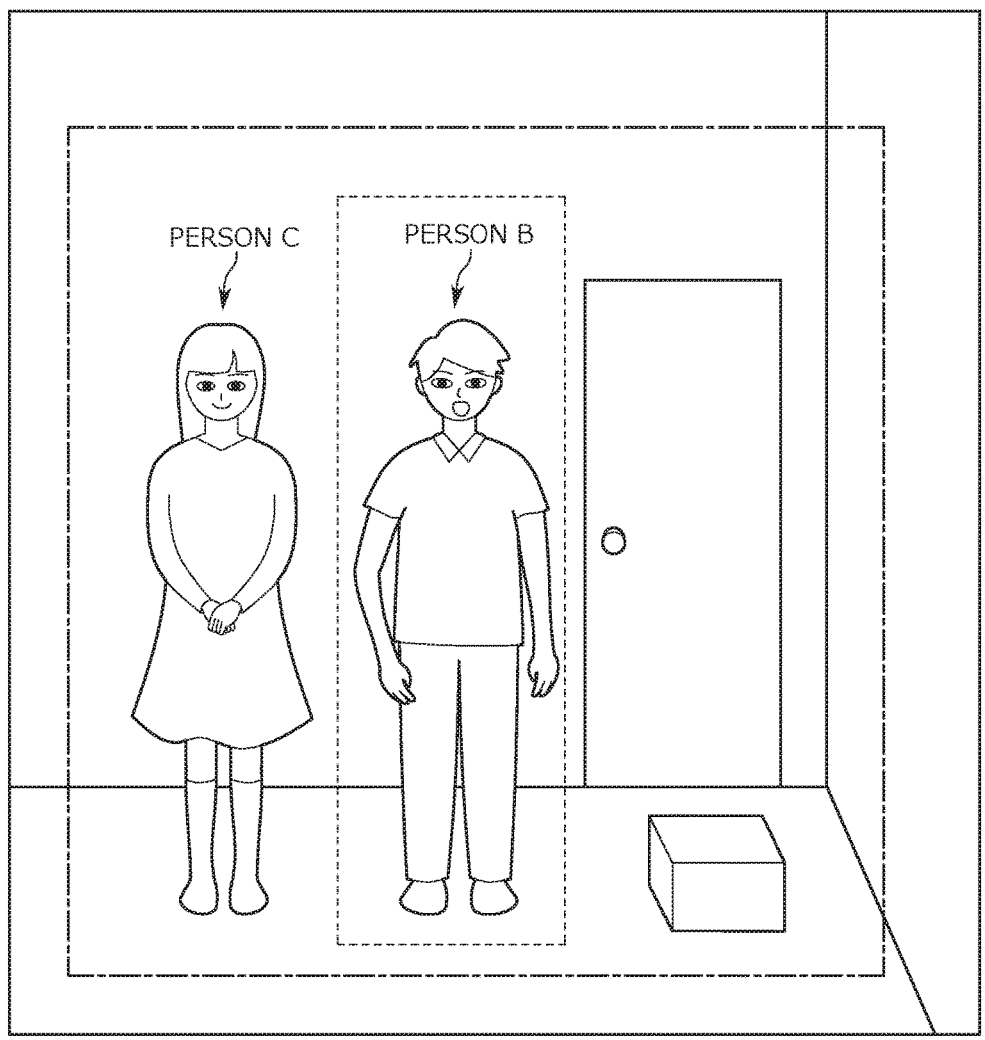
FIG. 3 is a view of an imaging area of an imaging device placed in the second space and a display area displayed in the first space.

Note that in the present embodiment, a portion of the image indicated by the dialogue data received from the second server 10B is displayed on the display screen of the display. In other words, the display of the present embodiment displays, on the display screen, a partial image of the image indicated by the dialogue data received by the first server 10A, the partial image having a display size corresponding to the size of the display screen. For the sake of clearer description, description will be made below with reference to FIG. 3. FIG. 3 is a view of an imaging area of the imaging camera 22 placed in the second space and a display area displayed on the display placed in the first space. Note that FIG. 3 is the view from the side close to the imaging camera 22 placed in the second space.

The dialogue data received from the second server 10B contains image data indicating the image acquired by the imaging camera 22 placed in the second space. Meanwhile, the imaging camera 22 acquires the image via the wide-angle lens 22a as described above. Thus, the above-described image indicated by the image data is a wide image with a relatively-great angle of field, specifically an image with an area surrounded by a thick chain line in FIG. 3. On the other hand, the image which can be displayed on the display screen of the display placed in the first space is an image with a smaller angle of field than that of the above-described wide image. That is, the partial image as a portion of the above-described wide image is displayed on the display screen of the display. The display size of the partial image will be described herein. The vertical width and horizontal width of the partial image are somewhat smaller than those of the wide image. For example, the partial image has a display size indicated by a thin dashed line in FIG. 3.

Note that in the present embodiment, the vertical width of the display screen has a sufficient length for displaying the entire image of the person in the front of the display. Thus, when the image (the partial image) of the dialogue partner is displayed on the display screen, the entire image of such a dialogue partner is displayed. Since the entire image of the dialogue partner is displayed as described above, the user feels a sense as if the user is in the same room as that of the dialogue partner. As a result, realistic sensation in a dialogue is further enhanced. The "entire image" described herein is the figure of the entire body from the head to the feet, and is a concept including a standing state, a seating state, and a state in which a portion of the body is hidden by an object disposed in the front of the body.

Figure 4B:
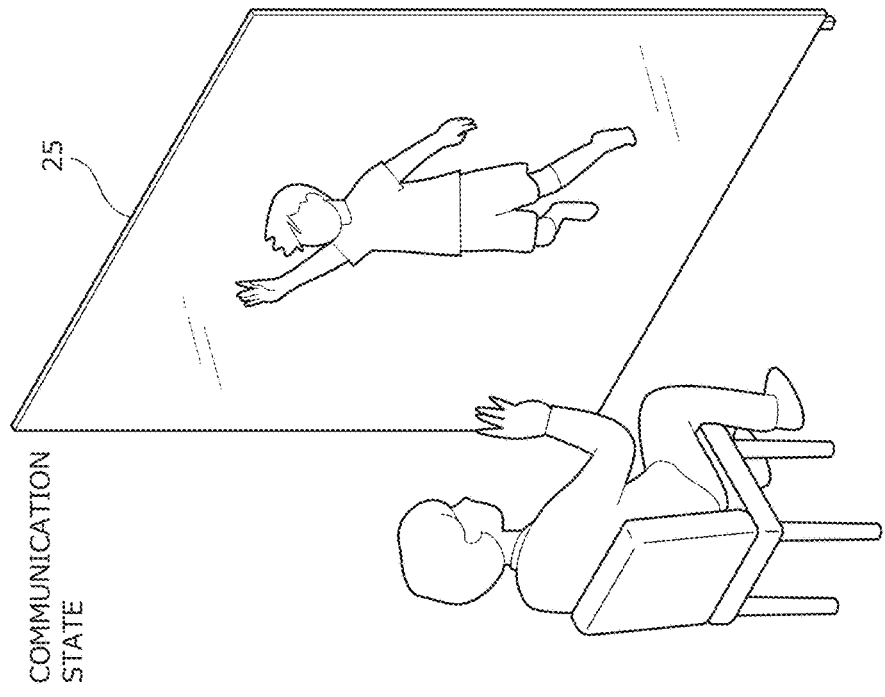
FIGS. 4A and 4B are views of an example of a display screen formation instrument of the present invention.
Figure 4A:
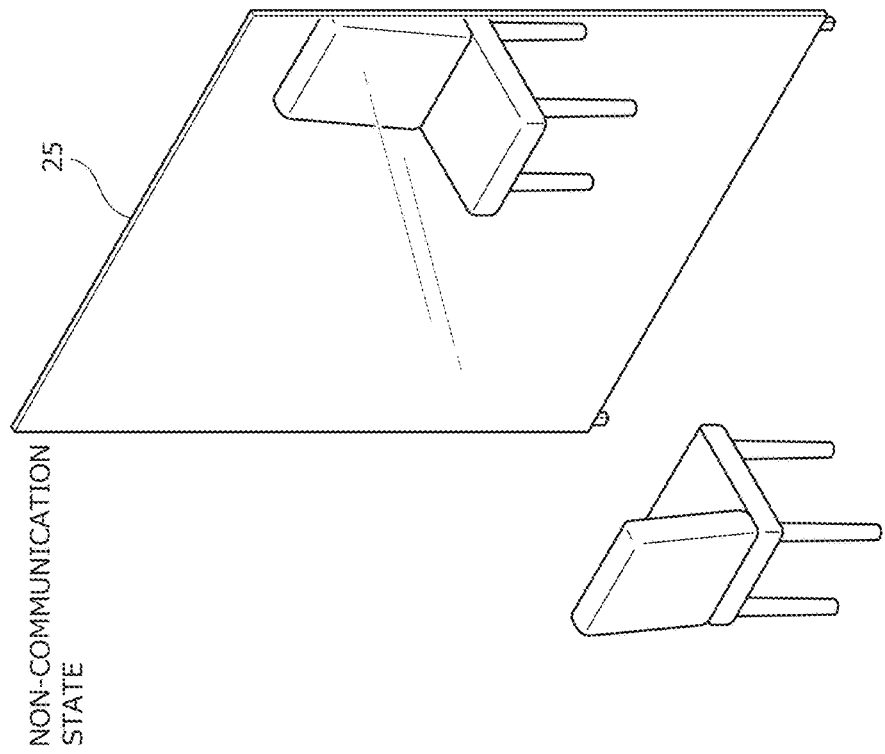

A configuration of the display will be further described. The display of the present embodiment has an outer appearance as a decoration, specifically a full-length mirror, disposed in the first space in a normal state. Only when a dialogue is held, the display of the present embodiment forms the display screen. Such a configuration will be described below with reference to FIGS. 4A and 4B. FIGS. 4A and 4B includes views of the display of the present embodiment. FIG. 4A illustrates a non-communication state when no dialogue is held, and FIG. 4B illustrates a communication state when a dialogue is held.

As illustrated in FIG. 4A, the display of the present embodiment has, in the non-communication state, the outer appearance as a portion of the full-length mirror (specifically, a mirrored portion) without formation of the display screen. On the other hand, in the communication state as illustrated in FIG. 4B, the display of the present embodiment forms the display screen, and the above-described partial image is displayed on the display screen. As described above, the display of the present embodiment includes the display-cum-mirror 25, and is freely switchable between a display screen formation state and a display screen deletion state.

As illustrated in FIG. 2, the display-cum-mirror 25 includes a built-in control circuit 26 and a built-in light emitter 27. The control circuit 26 receives a display screen formation command output from the first server 10A to turn on the light emitter 27 according to the command. Thus, the mirrored portion of the display-cum-mirror 25 serves as the display screen. When a screen formation condition is satisfied in the state in which the display-cum-mirror 25 does not form the display screen, the above-described display screen formation command is generated by the first server 10A with using such condition satisfaction as a trigger.

The screen formation condition described herein is preset as a condition for causing the display-cum-mirror 25 to form the display screen. In the present embodiment, the screen formation condition is that the above-described detection camera 23 detects (senses) the face of the person in the front of the display-cum-mirror 25. While the detection camera 23 is detecting (sensing) the face of the person in the front of the display-cum-mirror 25, the display-cum-mirror 25 continuously forms the display screen. On the other hand, when the detection camera 23 no longer detects (senses) the face of the person in the front of the display-cum-mirror 25, the display-cum-mirror 25 deletes the display screen, and again shows the outer appearance as the full-length mirror.

Note that the screen formation condition is not limited to sensing of the face of the person in the front of the display-cum-mirror 25. For example, the action or posture of the person in the front of the display-cum-mirror 25 may be a sensing target, and satisfaction of a preset condition by the sensing target may be the screen formation condition. Alternatively, the screen formation condition may be that a sound sensor configured to react with footsteps or speaking voice of a person senses sound with a volume of equal to or greater than a predetermined volume. For example, well-known configurations as described in JP 2013-073505 A and JP 2005-078347 A can be utilized as the above-described configuration using sound as the sensing target.

<<Functions of First Server and Second Server>>

Figure 5:
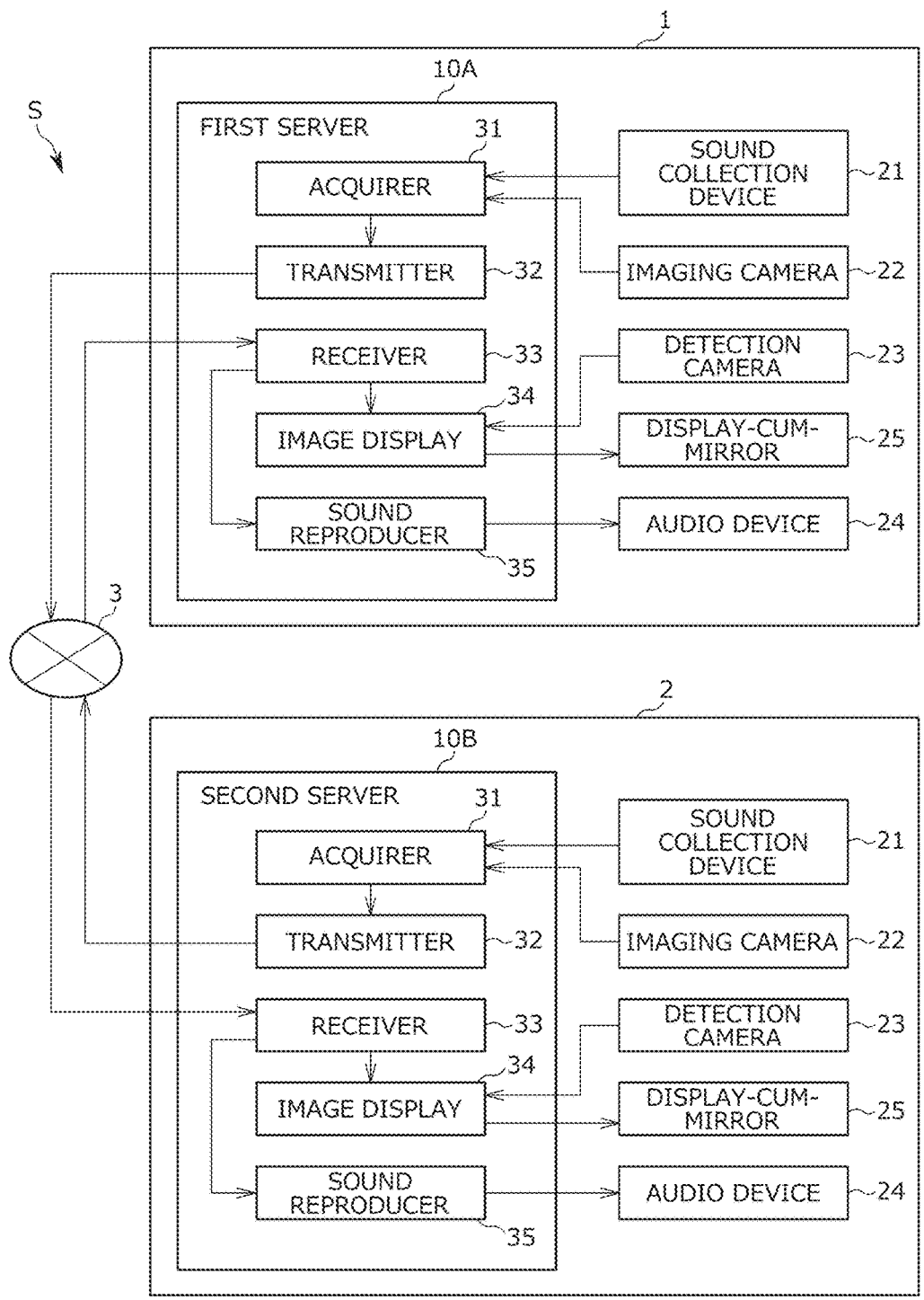
FIG. 5 is a diagram of each configuration of first and second computers in terms of function.

Next, the configurations of the first server 10A and the second server 10B will be described again in terms of function with reference to FIG. 5. FIG. 5 is a block diagram of the configurations of the first server 10A and the second server 10B in terms of function. Note that both of the first server 10A and the second server 10B have common functions, and therefore, only the configuration of the first server 10A will be described below.

The first server 10A generates the dialogue data indicating the image and sound of the first space, and then, transmits the dialogue data to the second server 10B. Meanwhile, the first server 10A receives the dialogue data from the second server 10B, and then, expands the dialogue data to execute the processing of reproducing the image and sound of the second space. The above-described functions are implemented in such a manner that the dialogue program installed in the first server 10A is started up. More specifically, the CPU 11 of the first server 10A reads and executes the dialogue program, and therefore, the first server 10A functions as an acquirer 31, a transmitter 32, a receiver 33, an image display 34, and a sound reproducer 35. Each function will be described below.

The acquirer 31 is configured to receive output signals from the sound collection device 21 and the imaging camera 22 placed in the first space, thereby acquiring the image and sound of the first space. The acquirer 31 is implemented in such a manner that the CPU 11, the memory 12, the hard disk drive 13, and the I/O port 15 cooperate with the dialogue program.

The transmitter 32 is configured to generate the dialogue data as the data acquired by the acquirer 31 and indicating the image and sound of the first space, thereby transmitting such data to the second server 10B. The transmitter 32 is implemented in such a manner that the CPU 11, the memory 12, and the communication interface 14 cooperate with the dialogue program. Note that the dialogue data is generated in such a manner that the image data indicating the image acquired by the imaging camera 22 and the sound data indicating the sound collected by the sound collection device 21 are multiplexed.

The receiver 33 is configured to receive, via the communication line 3, the dialogue data transmitted from the second server 10B. The receiver 33 is implemented in such a manner that the CPU 11, the memory 12, and the communication interface 14 cooperate with the dialogue program.

The image display 34 is configured to read the image data of the dialogue data received by the receiver 33, thereby displaying, on the display screen, the image indicated by the image data. The image display 34 is implemented in such a manner that the CPU 11, the memory 12, the hard disk drive 13, and the I/O port 15 cooperate with the dialogue program.

The image display 34 will be described in detail. In the present embodiment, the image display 34 controls the display-cum-mirror 25 configured to form the display screen, thereby switching the display-cum-mirror 25 between the display screen formation state and the display screen deletion state. Specifically, when the detection camera 23 detects (senses) the face of the person in the front of the display-cum-mirror 25 and outputs, as a sensing result, the image signal indicating the acquired image, the image display 34 receives such an image signal. Using such a state as a trigger, the image display 34 generates the display screen formation command to transmit such a command to the control circuit 26 of the display-cum-mirror 25. Thus, the light emitter 27 is turned on, and therefore, the mirrored portion of the display-cum-mirror 25 serves as the display screen.

After formation of the display screen, the image display 34 generates the image display command for displaying the image on the display screen, and then, transmits such a command to the control circuit 26. Thus, the image based on the dialogue data (in a precise sense, the image data of the dialogue data) received from the second server 10B is displayed on the display screen.

Further, according to the position of the face of the user detected by the detection camera 23, the image display 34 determines the image to be actually displayed on the display screen, the image being included in the image indicated by the image data. More specifically, in the present embodiment, the image indicated by the image data, i.e., the image acquired by the imaging camera 22, is a wide image, whereas the image which can be displayed on the display screen is a partial image as a portion of the wide image. Then, according to the position of the face of the user detected by the detection camera 23, the image display 34 determines which partial image of the wide image is to be displayed. Moreover, when a detection result (i.e., the position of the face of the user) of the detection camera 23 changes, the image display 34 again determines, according to the detection result after the change, which partial image of the wide image is to be displayed on the display screen.

The sound reproducer 35 is configured to read the sound data of the dialogue data received by the receiver 33, thereby reproducing, at the audio device 24, the sound indicated by the sound data. The sound reproducer 35 is implemented in such a manner that the CPU 11, the memory 12, the hard disk drive 13, and the I/O port 15 cooperate with the dialogue program. The sound reproducer 35 generates a sound reproduction command for reproducing the sound indicated by the above-described sound data, and then, transmits such a command to the audio device 24. When receiving the sound reproduction command, the audio device 24 generates the sound according to such a command. Thus, the sound indicated by the dialogue data (in a precise sense, the sound data of the dialogue data) received from the second server 10B is reproduced.

<<Image Display Method of the Present Embodiment>>

Next, an image display method (hereinafter referred to as a "present display method") of the present embodiment will be described. The present display method is implemented by the first server 10A and the second server 10B as described above. More specifically, the present display method is employed for the dialogue communication processing performed between the first server 10A and the second server 10B. In other words, each step performed during the dialogue communication processing corresponds to each step of the present display method.

Figure 6:
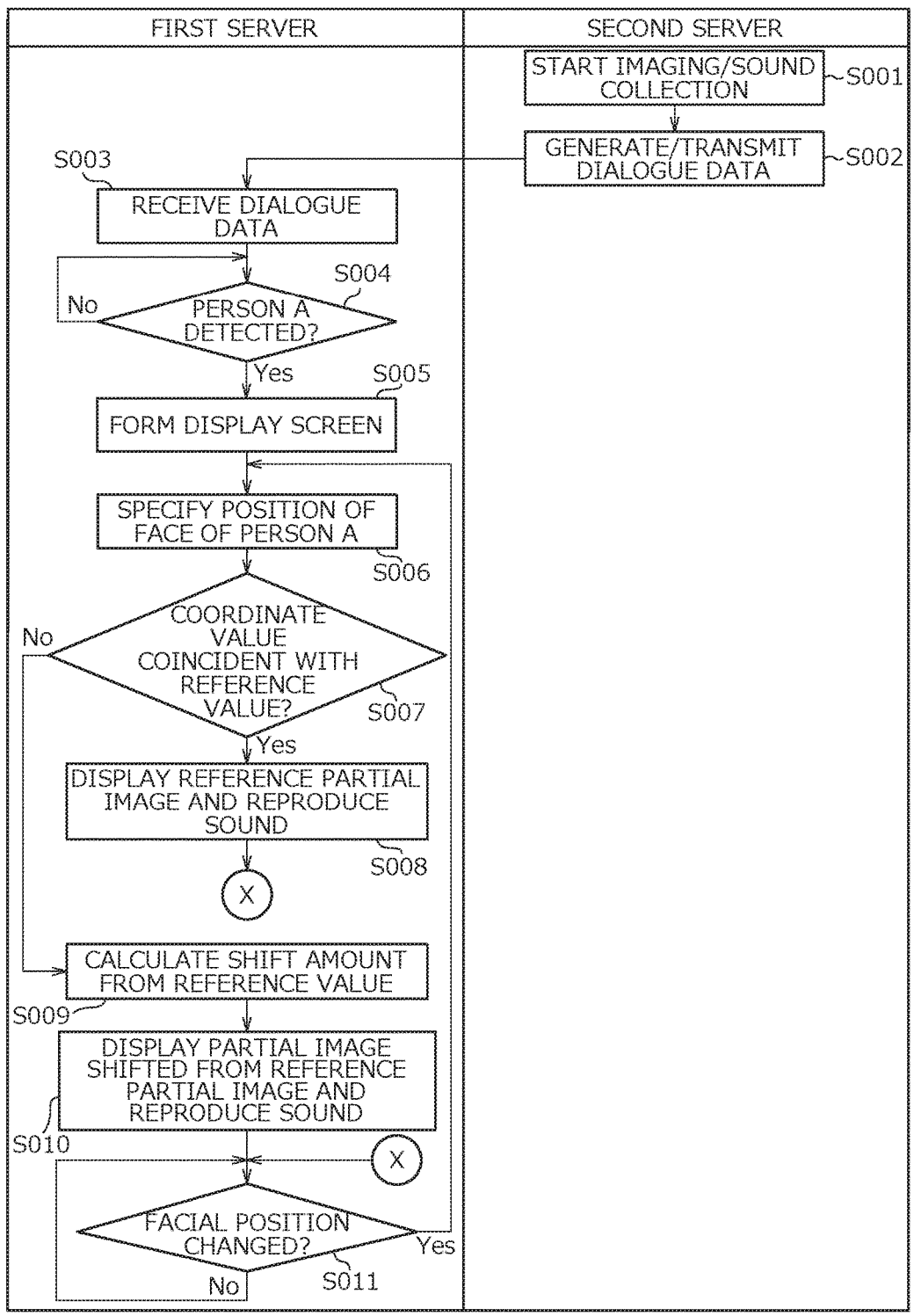
FIG. 6 is a flowchart for describing the flow of dialogue communication processing.

The flow of the dialogue communication processing will be described below with reference to FIG. 6. FIG. 6 is a flowchart for describing the flow of the dialogue communication processing. Note that a case where the image and sound of the second space are, based on the dialogue data transmitted from the second server 10B, reproduced in the first space where the person A is present will be described below as an example. Note that the procedure described below is similar in a case where the image and sound of the first space are, based on the dialogue data transmitted from the first server 10A, reproduced in the second space where the person B is present.

In the dialogue communication processing, imaging and sound collection first begin in the second space as shown in FIG. 6. This step begins from acquisition of the image and the sound by the second server 10B (S001). Note that in the present embodiment, imaging and sound collection begin when the person B is positioned at a predetermined position in the second space, specifically in the front of the display-cum-mirror 25. More specifically, when the person B stands in the front of the display-cum-mirror 25, the detection camera 23 placed in the second space detects (senses) the face of the person B. Using such a state as a trigger, the sound collection device 21 and the imaging camera 22 are started up to begin imaging and sound collection.

The second server 10B receives each output signal from the sound collection device 21 and the imaging camera 22, and then, converts such signals into the sound data and the image data. Further, the second server 10B multiplexes such data to generate the dialogue data, and then, transmits the dialogue data to the first server 10A (S002). The first server 10A receives the dialogue data via the communication line 3 (S003). At this step, e.g., ringtone, light emission, or an image for receipt notification is preferably utilized to notify the person A of receipt of the dialogue data.

Meanwhile, when the first server 10A receives the dialogue data, the detection camera 23 placed in the first space determines whether or not the person A is at the predetermined position in the first space, specifically in the front of the display-cum-mirror 25 (S004). When the person A is not present (No at S004), the first server 10A stands by until the person A comes to the front of the display-cum-mirror 25.

Conversely, when the detection camera 23 detects (senses) the face of the person A in the front of the display-cum-mirror 25 (Yes at S004), the first server 10A receives, from the detection camera 23, the image signal corresponding to the sensing result. Using such a state as a trigger, the first server 10A generates the display screen formation command to transmit such a command to the control circuit 26 of the display-cum-mirror 25. Then, when the control circuit 26 receives the display screen formation command, the light emitter 27 is turned on, and then, the mirrored portion of the display-cum-mirror 25 having showed the outer appearance as the full-length mirror so far serves as the display screen (S005).

Next, the first server 10A analyzes the image signal received from the detection camera 23, and specifies the position of the face of the person A (S006). Specifically, the first server 10A calculates a coordinate value indicating the position of the face of the person A in the front of the display-cum-mirror 25. The coordinate value indicating the position of the face as described herein is a coordinate value indicating a predetermined position of the face, such as a center position (the position of the center of gravity) of the face.

After calculation of the coordinate value, the first server 10A determines whether or not the calculated coordinate value is coincident with a reference value (S007). The reference value described herein is a preset value as a reference for specifying the position of the face of the user in the front of the display-cum-mirror 25. More specifically, in the present embodiment, the predetermined position (e.g., the center position of the face) of the face of the user in the front of the display-cum-mirror when facing the display-cum-mirror is taken as an original point, and the coordinate value of the original point is set as the reference value. Note that the reference value (in other words, the position of the face corresponding to the reference value) is not specifically limited, and can be optionally set. Moreover, the reference value is not limited to a single value, and may be a value with a range.

Figure 7A:
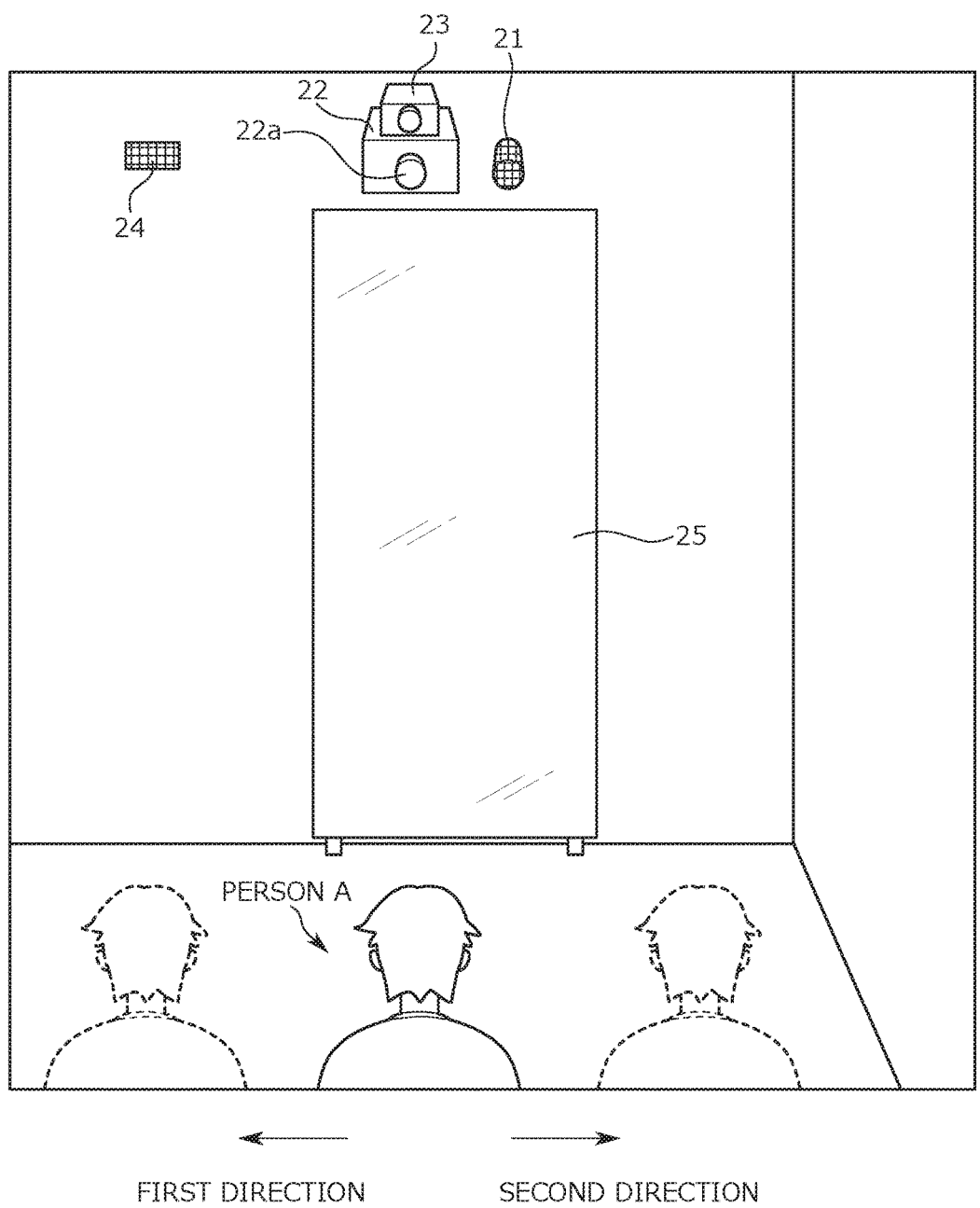
FIG. 7A is a view of the procedure for switching the image on the display screen when the position of the face of the user changes (No. 1)
Figure 7B:
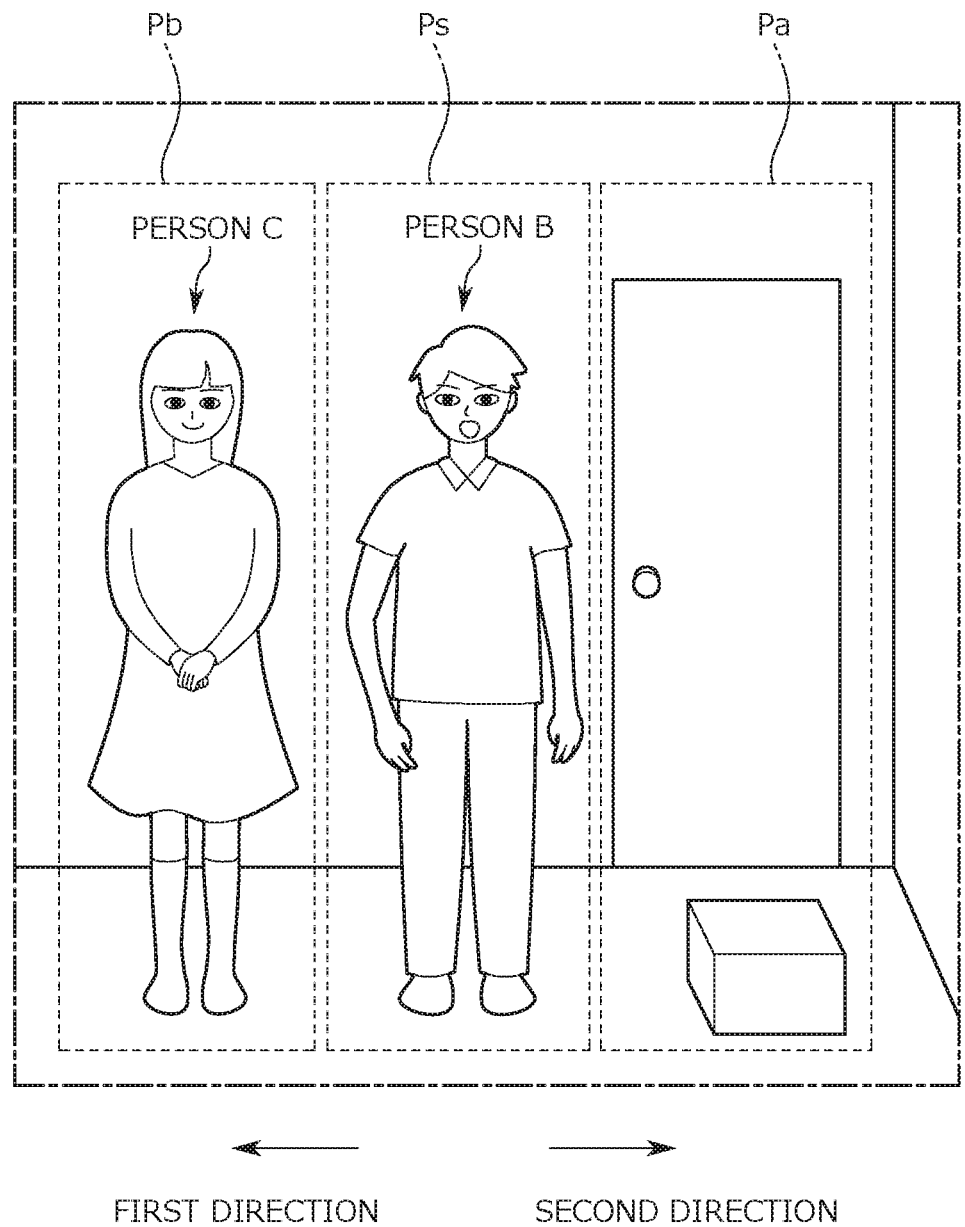
FIG. 7B is a view of the procedure for switching the image on the display screen when the position of the face of the user changes (No. 2)

Subsequently, the first server 10A expands, for reproducing the image and sound of the second space where the person B is present, the dialogue data received from the second server 10B to send the commands (the sound reproduction command and the image display command) to the audio device 24 and the display-cum-mirror 25. At this step, the first server 10A commands the display-cum-mirror 25 to display, on the display screen, the partial image corresponding to a determination result of the previous step S007. Such contents will be specifically described with reference to FIGS. 7A, 7B, and 8. FIGS. 7A and 7B are views of the procedure for switching the image on the display screen when the position of the face of the person A changes. In a precise sense, a state in which the position of the face of the person A is changing is illustrated in FIG. 7A, and a state in which the displayed image is switched according to such a change is illustrated in FIG. 7B.

First, a case where the calculated coordinate value is coincident with the reference value (Yes at S007), i.e., a case where the position of the face of the person A is coincident with the position of the face in the front of the display-cum-mirror 25 (specifically, the middle position of the positions of the person A illustrated in FIG. 7A), will be described. Of the wide image indicated by the image data of the dialogue data received from the second server 10B, a reference partial image set corresponding to the reference value is, in this case, displayed on the display screen by the first server 10A. The reference partial image described herein is an image positioned in a center region (a region positioned at the center in both of the vertical and horizontal directions) of the above-described wide image as indicated by reference characters "Ps" in FIG. 7B.

When a calculation result of the coordinate value is coincident with the reference value as described above, the reference partial image Ps of the wide image acquired by the imaging camera 22 in the second space is displayed on the display screen (S008). At the same time, the sound indicated by the sound data of the dialogue data received from the second server 10B is reproduced by the audio device 24 (S008).

Next, a case where the calculated coordinate value is different from the reference value (No at S007) will be described. In this case, the first server 10A calculates a shift amount between the calculated coordinate value and the reference value (S009). Subsequently, the first server 10A displays, on the display screen, a partial image of the wide image indicated by the image data, the partial image being shifted from the reference partial image by the calculated shift amount (S010). These steps are implemented by the above-described function of the image display 34.

The above-described steps S009, S010 will be clearly described. A difference between the coordinate value and the reference value means that the position of the face of the person A is shifted from a position (hereinafter referred to as a "reference position") when the person A is in the front of the display-cum-mirror 25. Specifically in the present embodiment, this means that the position of the face is shifted in any of first and second directions opposing each other. The first and second directions described herein are directions in a right-to-left direction. More specifically, when the display-cum-mirror 25 is viewed from the front, the first direction corresponds to a left direction, and the second direction corresponds to a right direction.

For example, when the position of the face of the person A is shifted from the reference position in the first direction (i.e., when the person A is at a left position as viewed in FIG. 7A), the first server 10A calculates such a shift amount. Subsequently, the first server 10A specifies a partial image of the wide image indicated by the image data, the partial image being shifted from the reference partial image in the second direction according to the above-described shift amount. The partial image specified at this point is an image positioned in a right region of the wide image, specifically an image indicated by reference characters "Pa" in FIG. 7B. Then, the first server 10A commands the display-cum-mirror 25 to display the specified partial image Pa on the display screen.

Similarly, when the position of the face of the person A is shifted from the reference position in the second direction (i.e., when the person A is at a right position as viewed in FIG. 7A), the first server 10A calculates such a shift amount. Subsequently, the first server 10A specifies a partial image of the wide image indicated by the image data, the partial image being shifted from the reference partial image in the first direction according to the above-described shift amount. The partial image specified at this point is an image positioned in a left region of the wide image, specifically an image indicated by reference characters "Pb" in FIG. 7B. Then, the first server 10A commands the display-cum-mirror 25 to display the specified partial image Pb on the display screen.

As described above, when the calculated coordinate value is different from the reference value, the image of the wide image acquired by the imaging camera 22 in the second space is displayed on the display screen, the image being shifted from the reference partial image according to the shift amount between the coordinate value and the reference value (S010). At the same time, the sound indicated by the sound data of the dialogue data received from the second server 10B is reproduced by the audio device 24 (S010).

Then, in the present embodiment, when the person A moves right to left in the front of the display-cum-mirror 25 to change the position of the face (S011), a series of steps S006 to S010 in image displaying as described above is repeated. Thus, when the position of the face of the person A moves, for example, from the reference position in the first direction, the reference partial image having been displayed on the display screen is switched to the partial image shifted from the reference partial image in the second direction. Similarly, when the position of the face of the person A moves from the reference position in the second direction, the reference partial image having been displayed on the display screen is switched to the partial image shifted from the reference partial image in the first direction.

In the present embodiment as described above, when the person A in the front of the display-cum-mirror 25 moves one's face in the first direction as viewed from the display-cum-mirror 25, the first server 10A displays, on the display screen, the partial image shifted in the second direction from the partial image having been displayed before movement. Similarly, when the person A in the front of the display-cum-mirror 25 moves one's face in the second direction as viewed from the display-cum-mirror 25, the first server 10A displays, on the display screen, the partial image shifted in the first direction from the partial image having been displayed before movement. Thus, merely by movement of the face, the person A can view an object (a person) next to an object (a person) having been viewed via the display screen before movement. That is, in the present embodiment, a so-called "glancing" visual effect can be obtained.

Figure 8:
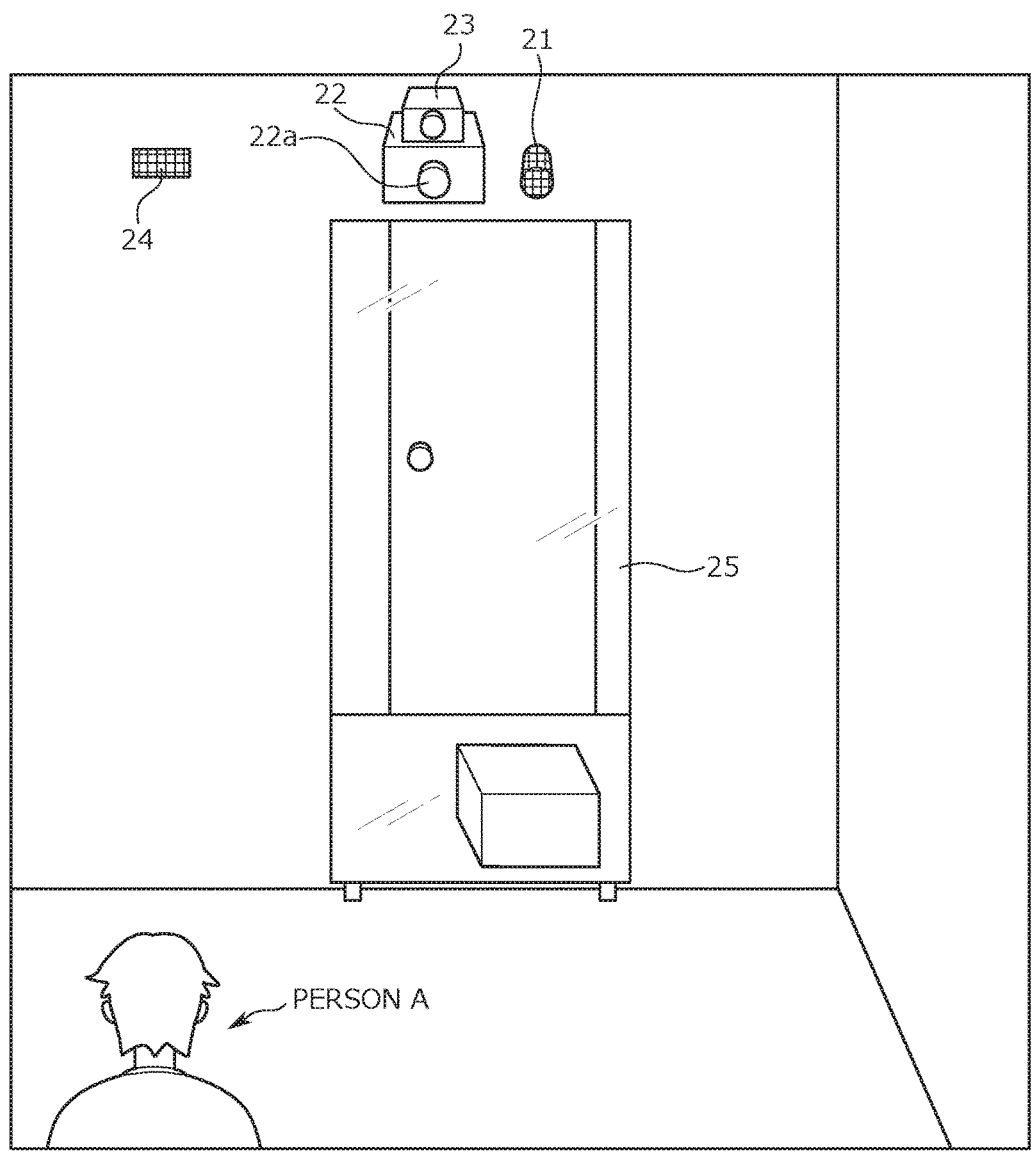
FIG. 8 is a view of a situation when the image on the display screen is switched by the change in the position of the face of the user.

The "glancing" effect will be specifically described. When the position of the face of the person A is at the reference position, the entire image of the person B is, as the reference partial image, displayed on the display screen as illustrated in FIG. 1. In such a state, when the person A moves in the first direction to shift the position of the face of the person A in the same direction, the partial image of the wide image acquired by the imaging camera 22 placed in the second space is displayed on the display screen, the partial image being shifted from the reference partial image in the second direction. Thus, as illustrated in FIG. 8, an image of an object (in a precise sense, a box-shaped object at the right in FIG. 3 when the person B is viewed from the front) next to the person B is displayed. FIG. 8 is a view of a situation where the image on the display screen is switched by a change in the position of the face of the person A.

When the person A moves in the second direction to shift the position of the face of the person A in the same direction, the partial image of the above-described wide image is displayed on the display screen, the partial image being shifted from the reference partial image in the first direction. Thus, an image of a person (in a precise sense, a person C at the left in FIG. 3 when the person B is viewed from the front) next to the person B is displayed.

In the present embodiment as described above, the partial image of the wide image actually displayed on the display screen is switched in association with displacement of the position of the face of the user, and therefore, the "glancing" visual effect can be obtained by a relatively-simple configuration. More specifically, in a configuration in which the imaging area of the imaging camera 22 is changed according to the position of the user as in JP 2005-286442 A described in the background art section, the displayed image can be switched according to a change in the position of the user. However, such a configuration requires an additional mechanism for changing the imaging area of the imaging camera 22, leading to a complicated configuration and a cost increase. On the other hand, in the configuration of the present embodiment, the mechanism for changing the imaging area of the imaging camera 22 is not necessary. Thus, the configuration is simplified by such mechanism omission, and a cost is reduced.

By the "glancing" visual effect as described above, a dialogue held between the person A and the person B, i.e., a remote dialogue using the present display method, provides higher realistic sensation. Note that for a more-effective "glancing" visual effect, it is preferable that the partial image is gradually (continuously) switched according to the moving speed of the face of the person A.

OTHER EMBODIMENTS

In the above-described embodiment, the examples of the image display system and the image display method according to the present invention have been described. Note that the above-described embodiment has been set forth merely as an example for the sake of easy understanding of the present invention, and is not intended to limit the present invention. That is, changes and modifications can be made to the present invention without departing from the gist of the present invention, and needless to say, equivalents are included in the present invention.

Moreover, in the present embodiment, the partial image of the wide image actually displayed on the display screen is switched in association with displacement of the position of the face of the user. On this point, the direction of moving the face of the user and the direction of changing the partial image are the right-to-left direction, but the present invention is not limited to such a direction. For example, when the position of the face of the user moves up and down, the partial image displayed on the display screen may be accordingly switched up and down (i.e., switched to a partial image shifted up and down from the partial image before movement).

Further, in the present embodiment, the dialogue units 1, 2 owned respectively by the user (the person A) and the dialogue partner (the person B) have the common configuration. More specifically, the configuration for obtaining the above-described "glancing" visual effect is prepared for each of the user and the dialogue partner. Note that the present invention is not limited to such a configuration, and the configuration for obtaining the "glancing" visual effect may be prepared only for one of the user or the dialogue partner as illustrated in FIG. 9. FIG. 9 is a diagram of a configuration of an image display system Sx of a variation.

The image display system Sx of the variation will be described with reference to FIG. 9. A user-side dialogue unit 101 has a similar configuration to that of the above-described embodiment, except that the imaging camera 22 does not have the wide-angle lens 22a. That is, a first server 10A of the user-side dialogue unit 101 has a similar configuration to that of the first server 10A of the above-described embodiment. In the variation, the first server 10A has the function of switching, according to the detection result of the position of the face of the user, the partial image displayed on the display screen. On the other hand, no detection camera 23 is placed at a dialogue-partner-side dialogue unit 102, and a second server 10B does not have the function of switching the partial image displayed on the display screen. On the above-described point, the image display system Sx of the variation is different from the image display system (i.e., the present system S) of the above-described embodiment. In the configuration of the image display system Sx of the variation, the "glancing" visual effect is obtained only on the user side of the user side and the dialogue partner side.

In addition, in the present embodiment, the display is the display-cum-mirror 25 also functioning as the full-length mirror in the normal state, but is not limited to the display-cum-mirror 25. A typical versatile display may be used as the display. For example, a wall-hanging display panel may be used.

REFERENCE SIGNS LIST 1, 2, 101, 102: dialogue unit
3: communication line
10A: first server
10B: second server
11: CPU
12: memory
13: hard disk drive
14: communication interface
15: I/O port
21: sound collection device
22: imaging camera
  22a: wide-angle lens
23: detection camera
24: audio device
25: display-cum-mirror
26: control circuit
27: light emitter
31: acquirer
32: transmitter
33: receiver
34: image display
35: sound reproducer
S: present system
Sx: image display system of variation

The invention claimed is:

1. An image display system used for viewing, by a user in a first space, an image of a second space remote from the first space, comprising:
  an imaging device placed in the second space;
  a display screen formation instrument placed in the first space to form an image display screen;
  a receiver configured to receive image data from the imaging device, the image data indicating an image acquired by the imaging device;
  an image display configured to display, on the display screen, a partial image of the image indicated by the image data received by the receiver, the partial image having a display size corresponding to a size of the display screen; and
  a detector configured to detect at least one of a position, a facial direction, a visual line, or a facial position of the user in the first space,
  wherein:
    when a detection result of the detector changes, the image display determines, according to the detection result after the change, which partial image of the image indicated by the image data is to be displayed on the display screen,
    the detector is another imaging device placed in the first space and configured to image the user in front of the display screen formation instrument to detect a position of a face of the user, and
    the image display calculates a coordinate value indicating the position of the face of the user detected by the another imaging device, and when the coordinate value changes due to a change in the position of the face of the user, determines, according to the coordinate value after the change, which partial image of the image indicated by the image data is to be displayed on the display screen.

2. The image display system of claim 1, further comprising:
  first and second computers communicable with each other,
  the first computer is connected to the imaging device, and functions as a transmitter configured to transmit the image data indicating the image acquired by the imaging device, and
  the second computer is connected to the display screen formation instrument and the detector, and functions as the receiver and the image display.

3. The image display system of claim 1, wherein the imaging device is a fixed camera including a fish-eye lens or a wide-angle lens and configured to acquire an image via the fish-eye lens or the wide-angle lens.

4. The image display system of claim 1, wherein when the calculated coordinate value is a preset reference value, the image display displays, on the display screen, a reference partial image of the image indicated by the image data, the reference partial image being set corresponding to the reference value, and
  when the calculated coordinate value is different from the reference value, the image display displays, on the display screen, a partial image of the image indicated by the image data, the partial image being shifted from the reference partial image according to a shift amount between the coordinate value and the reference value.

5. The image display system of claim 4, wherein when the user in the front of the display screen formation instrument moves one's face in a first direction of first and second directions opposing each other as viewed from the display screen formation instrument, the image display displays, on the display screen, the partial image shifted in the second direction from the partial image displayed before movement, and
  when the user in the front of the display screen formation instrument moves one's face in the second direction as viewed from the display screen formation instrument, the image display displays, on the display screen, the partial image shifted in the first direction from the partial image displayed before movement.

6. The image display system of claim 1, wherein the display screen formation instrument forms a portion of a building material, furniture, or a decoration disposed in the first space, and forms the display screen,
  a sensor is provided in the first space, the sensor being configured to sense a sensing target satisfying a preset sensing condition when the sensing target is at least one of action of the user, a position of the user, a posture of the user, or sound from the user,
  while the sensor is not sensing the sensing target satisfying the sensing condition, the display screen formation instrument has an outer appearance as the portion without formation of the display screen, and
  only while the sensor is sensing the sensing target satisfying the sensing condition, the display screen formation instrument forms the display screen.

7. An image display method in which a user in a first space uses a computer to view an image of a second space remote from the first space, comprising:

a step of receiving, by the computer, image data from an imaging device placed in the second space, the image data indicating an image acquired by the imaging device;

a step of displaying, by the computer, a partial image of the image indicated by the received image data on a display screen formed by a display screen formation instrument placed in the first space, the partial image having a display size corresponding to a size of the display screen; and a step of detecting, by a detector, at least one of a position, a facial direction, a visual line, or a facial position of the user in the first space, wherein when a detection result of the detector changes during execution of the step of displaying the partial image on the display screen, the computer determines, according to the detection result after the change, which partial image of the image indicated by the image data is to be displayed on the display screen, and wherein the detector is another imaging device placed in the first space, the method further comprising:

a step of imaging the user in front of the display screen formation instrument to detect a position of a face of the user, a step of calculating a coordinate value indicating the position of the face of the user detected by the another imaging device, and when the coordinate value changes due to a change in the position of the face of the user, a step of determining, according to the coordinate value after the change, which partial image of the image indicated by the image data is to be displayed on the display screen.

* * * * *